Patented July 20, 1943

2,325,015

UNITED STATES PATENT OFFICE 2,325,015

HYDROCARBON CONVERSION

John Turkevich, Princeton, N. J., assignor to Process Management Company, Inc., Wilmington, Del., a corporation of Delaware No Drawing. Application August 27, 1940, Serial No. 354,391

5 Claims. (Cl. 260—668)

This invention relates to the catalytic dehydrogenation of hydrocarbons. More particularly, the invention relates to the dehydrogenation of hydrocarbons by contact thereof at elevated temperature with dehydrogenating catalysts derived from heteropoly compounds such as the heteropoly acids and their salts.

Heteropoly compounds are complex inorganic compounds of high molecular weight comprising a nuclear element united in stable bond with a large molecular percentage of a metallic oxide. They are characterized by a definite arrangement of the atoms, a stable complex structure and a large spherical shape. For example, the heteropoly complex of phospho-molybdic acid consists of a large sphere with a phosphorous atom in the center, a shell of four oxygen atoms, tightly packed around it then a shell of molybdenum atoms and then another shell of oxygen atoms. Each such sphere contains 55 atoms of phosphorus, molybdenum and oxygen.

In connection with this invention it has been found that heteropoly compounds, such as the salts of the heteropoly acids, furnish excellent source material for dehydrogenating catalysts. In particular it has been found that molybdenum oxide catalysts of excellent dehydrogenating properties may be prepared through the formation of a suitable salt of a heteropoly acid of molybdenum and a suitable nuclear element and the subsequent reduction of the salt under conditions effective to remove oxygen atoms from the surface of the molecule, but not so severe as to substantially alter the characteristic structure of the heterpoly compound molecule.

In the preparation of the improved catalyst it is convenient to form the heterpoly compound as a suitable salt of the heterpoly acid. Preferably, the ammonium salt is employed but other salts may be employed, such as the salts having as cations metals which, upon reduction of the heteropoly compound, do not decrease its stability or impair its catalytic activity. However, the salts of barium and potassium should not be employed.

It has been found that molybdenum oxide catalysts of exceptional catalytic activity are formed by decomposition of ammonium salts of heteropoly acids of molybdenum in combination with phosphorus or aluminum as the nuclear element. For example, it has been found that excellent catalysts may be prepared by the reduction of the ammonium salts of phospho-molybdic acid and alumino-molybdic acid. The invention will be described further by reference to the preparation and testing of catalysts obtained by the reduction of these compounds.

The ammonium salt of phospho-molybdic acid was prepared by dissolving 12 grams of molybdic acid ($MoO_3$) and 1.3 grams of ammonium carbonate monohydrate in 200 cc. of boiling mater. One gram of ammonium hydrogen phosphate and 10 cc. of concentrated nitric acid were added, and the combined solutions were heated slowly. After some time a bright yellow precipitate of the ammonium salt was obtained. It had the formula $(NH_4)_3H_4(P(Mo_2O_7)_6).28H_2O$. The precipitate was filtered, washed with very dilute nitric acid and dried overnight at 110° C.

The ammonium salt of alumino-molybdic acid was prepared by mixing a solution of 50 grams of ammonium paramolybdate in 150 cc. water and a solution of 3 grams of aluminum nitrate nonahydrate in 50 cc. of water. The combined solutions were brought to boiling, and upon cooling white crystals were formed having the formula $(NH_4)_3H_6(Al(MoO_4)_6).7H_2O$. These crystals were filtered, washer and dried overnight at 110° C.

These salts were reduced by heating in an atmosphere of hydrogen to a temperature of 475° C. during a period of 12 hours. To obtain a catalytically active material retaining the characteristic structure of the original heteropoly compound any suitable method may be employed in the reduction operation which effects substantial removal of oxygen atoms from the sphere without breaking down the complex structure of the heteropoly compound.

The catalysts prepared as described above were employed in the dehydrogenation treatment of heptane at a temperature of 475° C. at atmospheric pressure. During these tests heptane was passed over the catalysts at a space velocity of approximately 1.33 volumes (liquid basis) per hour per unit quantity of catalyst. Under these conditions the operation employing the catalyst prepared by reduction of the ammonium salt of alumino-molybdic acid produced in a two-hour run approximately 170 volumes of gas per liquid volume of heptane charged. The gas contained 85% or more of hydrogen, and the liquid product contained 17% aromatics (toluene) and 4% olefins (heptene). Under the same conditions the operation employing the catalyst prepared by reduction of the ammonium salt of phospho-molybdic acid produced in a two-hour run 160 volumes of gas per liquid volume of heptane charged. The gas contained at least 85% hydrogen, and the liquid product contained 9% aromatics (toluene) and 5% olefins heptene). Unpromoted molybdic oxide, such as that prepared by decomposition of ammonium molybdate functions under similar conditions primarily as a cracking catalyst and not as a dehydrogenating catalyst, since the gas produced contains only about 40 to 50% of hydrogen. By the preparation of molybdenum oxide catalyst in accordance with the invention it is possible to convert this material from a cracking catalyst to a dehydrogenating catalyst.

The process as illustrated by the foregoing specific examples has the advantage that it makes possible the conversion of aliphatic hydrocarbons containing at least six carbon atoms per molecule such as heptane to aromatic hydrocarbons while maintaining a low concentration of olefinic hydrocarbons in the liquid product.

In the conversion of aliphatic hydrocarbons to aromatic hydrocarbons by contact thereof with dehydrogenating catalysts the hydrocarbon vapors are passed over the catalyst at a temperature in the range of 325 to 650° C., preferably 450 to 550° C., at atmospheric or higher pressure. The hydrocarbons are passed over the catalyst at a space velocity which, while sufficient to effect production of aromatic hydrocarbons at a substantial rate, is sufficiently low to produce a substantial proportion of aromatic hydrocarbons in the liquid product. The rate of conversion of aliphatic hydrocarbons varies inversely to the space velocity and directly with the temperature. At lower temperatures within the above-mentioned temperature range a lower space velocity may be employed while at higher temperatures a higher space velocity may be used although these factors are governed by the character of the material treated and the nature of the product desired. In general the space velocities which may be employed advantageously for the conversion of aliphatic hydrocarbons to aromatic hydrocarbons fall within the range of 0.1 to 3 volumes of aliphatic hydrocarbons (liquid basis) per volume of catalyst space per hour. The most advantageous space velocities are found within the range of 1 to 2 volumes of liquid per volume of catalyst per hour.

In the conversion of aliphatic paraffinic hydrocarbons to aromatic hydrocarbons by contact with active dehydrogenating catalysts such as gel-type chromium oxide catalysts it is found that when operating conditions are controlled to effect production of a substantial proportion of aromatic hydrocarbons in the liquid product there occurs also a substantial production of unsaturated aliphatic hydrocarbons. For example, in the conversion of heptane to toluene by contact thereof with chromium oxide under conditions effective to produce 10% or more of toluene in the liquid product the latter also contains 10% or more of heptene. As the operating conditions are varied to increase the concentration of toluene in the liquid product to a figure greater than 10% the percentage of heptene in the liquid product increases also to a maximum of about 15%. The present invention is advantageous therefore in that it provides a means for effecting the conversion of aliphatic hydrocarbon such as heptane to aromatic hydrocarbon under conditions effective to produce a substantial proportion of toluene in the liquid product while maintaining the proportion of heptene therein at substantially less than 10%.

While the present invention is particularly adapted to the conversion of aliphatic hydrocarbons having at least six carbon atoms per molecule to aromatic hydrocarbons by dehydrogenation and cyclization reactions, the process is applicable also to the dehydrogenation of other hydrocarbons, such as normally gaseous hydrocarbons, to form corresponding unsaturated hydrocarbons.

While the invention has been illustrated by reference to the treatment of a single hydrocarbon compound, the process is equally applicable to the treatment of mixtures of hydrocarbons. For example, the process may be applied to the dehydrogenation treatment of a gasoline of low anti-knock value to improve its anti-knock qualities by the conversion of aliphatic hydrocarbons contained therein to aromatic hydrocarbons and by the production therein of other unsaturated constituents.

In accordance with the invention the reduction product of the heteropoly compound may be used as such as the catalyst, or it may be employed in combination with other active or inactive materials. For example, the heteropoly acid salt may be precipitated on a suitable supporting material, such as alumina, after which reduction of the heteropoly compound is effected in the manner described above to produce a compound catalyst.

I claim:

1. The method of dehydrogenating hydrocarbons which comprises contacting said hydrocarbons at elevated temperature with a molybdenum oxide catalyst under reaction conditions such that dehydrogenation is a principal reaction and there is a net production of hydrogen, the said molybdenum oxide catalyst having been prepared by reducing an ammonium salt of a heteropoly acid of molybdenum containing as the nuclear element a member of the third series of the periodic table selected from the group consisting of aluminum and phosphorus, the said reduction being carried out under reducing conditions sufficiently severe to effect substantial removal of oxygen atoms from the heteropoly compound but sufficiently mild to maintain in the residue the characteristic structure of the heteropoly compound.

2. The method of converting aliphatic hydrocarbons containing at least six carbon atoms per molecule to aromatic hydrocarbons by hydrogenation and cyclization thereof which comprises contacting said aliphatic hydrocarbons at elevated temperature with a molybdenum oxide catalyst under reaction conditions such that dehydrogenation and cyclization are principal reactions and there is a net production of hydrogen, the said molybdenum oxide catalyst having been prepared by reducing an ammonium salt of a heteropoly acid of molybdenum containing as the nuclear element a member of the third series of the periodic table selected from the group consisting of aluminum and phosphorus, the said reduction being carried out under reducing conditions sufficiently severe to effect substantial removal of oxygen atoms from the heteropoly compound but sufficiently mild to maintain in the residue the characteristic structure of the heteropoly compound.

3. The method of dehydrogenating hydrocarbons which comprises contacting said hydrocarbons at elevated temperature with a catalyst under reaction conditions such that dehydrogenation and cyclization are principal reactions and there is a net production of hydrogen, the said catalyst essentially comprising a heteropoly molybdenum oxide compound prepared by reducing an ammonium salt of alumino-molybdic acid under reducing conditions sufficiently severe to effect substantial removal of oxygen atoms from the heteropoly compound but sufficiently mild to tain in the residue the characteristic structure of the heteropoly compound.

4. The method of dehydrogenating hydrocarbons which comprises contacting said hydrocarbons at elevated temperature with a catalyst under reaction conditions such that dehydrogenation and cyclization are principal reactions and there is a net production of hydrogen, the said catalyst essentially comprising a heteropoly molybdenum oxide compound prepared by reducing an ammonium salt of phospho-molybdic acid under reducing conditions sufficiently severe to effect substantial removal of oxygen atoms from the heteropoly compound but sufficiently mild to retain in the residue the characteristic structure of the heteropoly compound.

5. The method of dehydrogenating hydrocarbons which comprises contacting said hydrocarbons at elevated temperature with a molybdenum oxide catalyst essentially comprising a reduction product of a salt of a heteropoly acid prepared by reducing a salt of a heteropoly acid of molybdenum containing as the nuclear element a member of the third series of the periodic table selected from the group consisting of aluminum and phosphorus and containing a cation which after reduction does not impair the catalyst, under reducing conditions sufficiently severe to effect the substantial removal of oxygen atoms from the heteropoly compound but sufficiently mild to retain in the residue the characteristic structure of the heteropoly compound, the hydrocarbons and catalyst being contacted under reactions conditions such that dehydrogenation is a principal reaction, and there is a net production of hydrogen.

JOHN TURKEVICH.